March 15, 1955 S. D. RUSSELL 2,703,957
WIND GUARD FOR PICK-UP

Original Filed Sept. 8, 1953 2 Sheets-Sheet 1

Inventor:
Stanley D. Russell.
By
Soans, Glaister & Anderson
Attys.

March 15, 1955  S. D. RUSSELL  2,703,957
WIND GUARD FOR PICK-UP
Original Filed Sept. 8, 1953  2 Sheets-Sheet 2
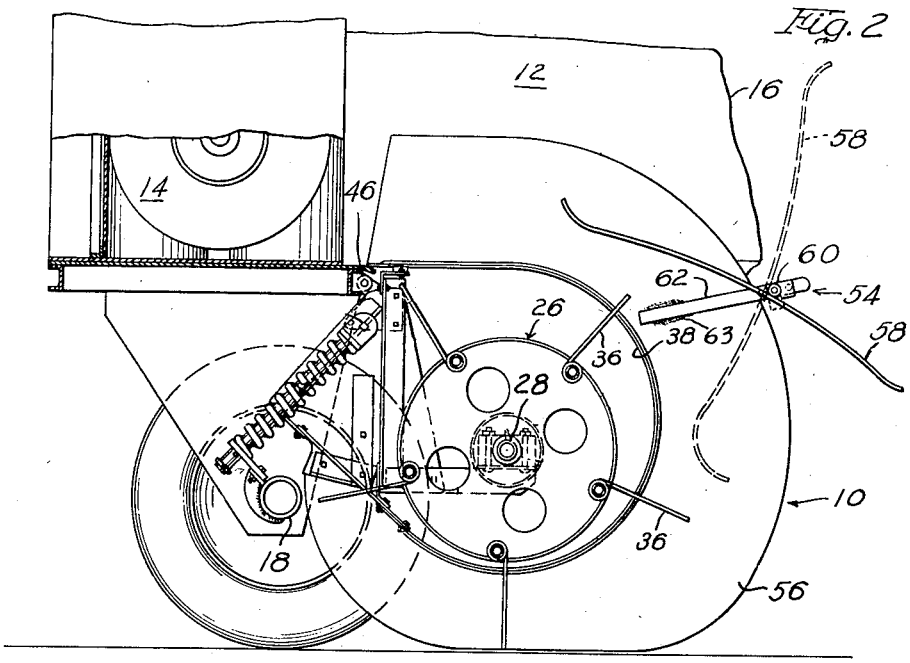
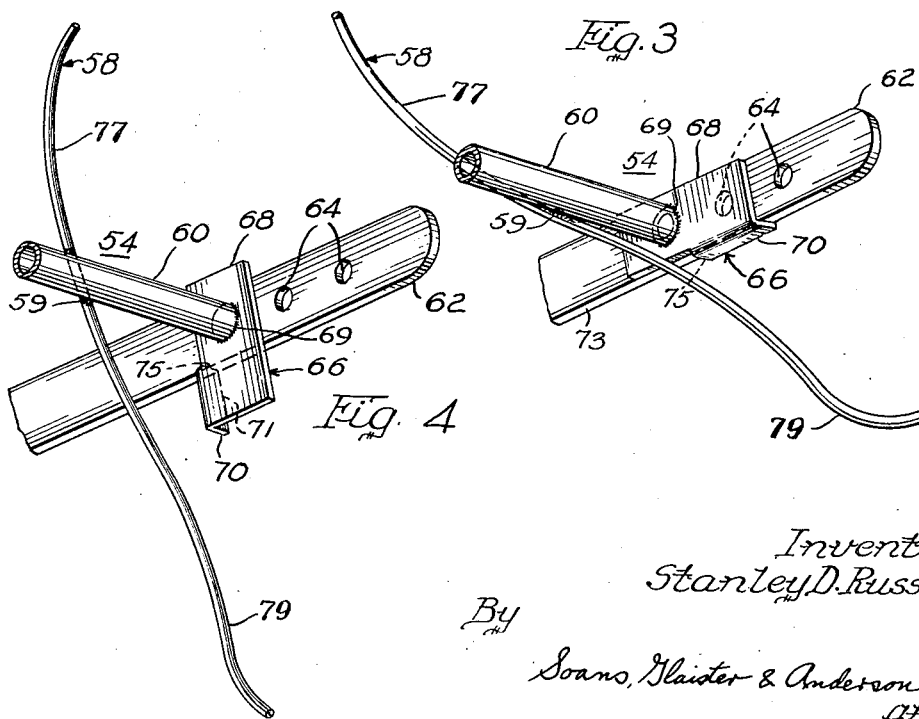
Inventor:
Stanley D. Russell
By
Soans, Glaister & Anderson
Attys.

United States Patent Office 2,703,957
Patented Mar. 15, 1955

2,703,957

WIND GUARD FOR PICK-UP

Stanley D. Russell, Racine, Wis., assignor to J. I. Case Company, Racine, Wis., a corporation of Wisconsin Original application September 8, 1953, Serial No. 378,699. Divided and this application February 25, 1954, Serial No. 412,420

5 Claims. (Cl. 56—364)

The present invention relates generally to a pick-up unit of the type used with mobile crop-handling machinery, and is more particularly directed to a new and improved form of wind guard for a pick-up unit. This application is a division of my co-pending application Serial No. 378,699 filed September 8, 1953, which in turn is a division of my copending application Serial No. 13,969, filed March 10, 1948, now U. S. Patent 2,674,839.

The principal object of the present invention is to provide a novel and improved form of wind guard for a pick-up unit. Another object of this invention is to provide a novel wind guard arrangement for a pick-up unit, which is selectively positionable in either of two positions, and which is self-sustaining in the selected position during operation of the unit. Other objects and advantages will be noted as the disclosure progresses with reference to the accompanying 2 sheets of drawings, wherein:

Fig. 2 is a sectional view of the machine in Fig. 1, taken along a line parallel to the line of draft of the implement.

Fig. 3 is an enlarged, perspective view of a portion of the wind guard which forms a part of the machine illustrated in Figs. 1 and 2.

Fig. 4 is a view similar to Fig. 3, showing the wind guard in another position.

Figure 1:
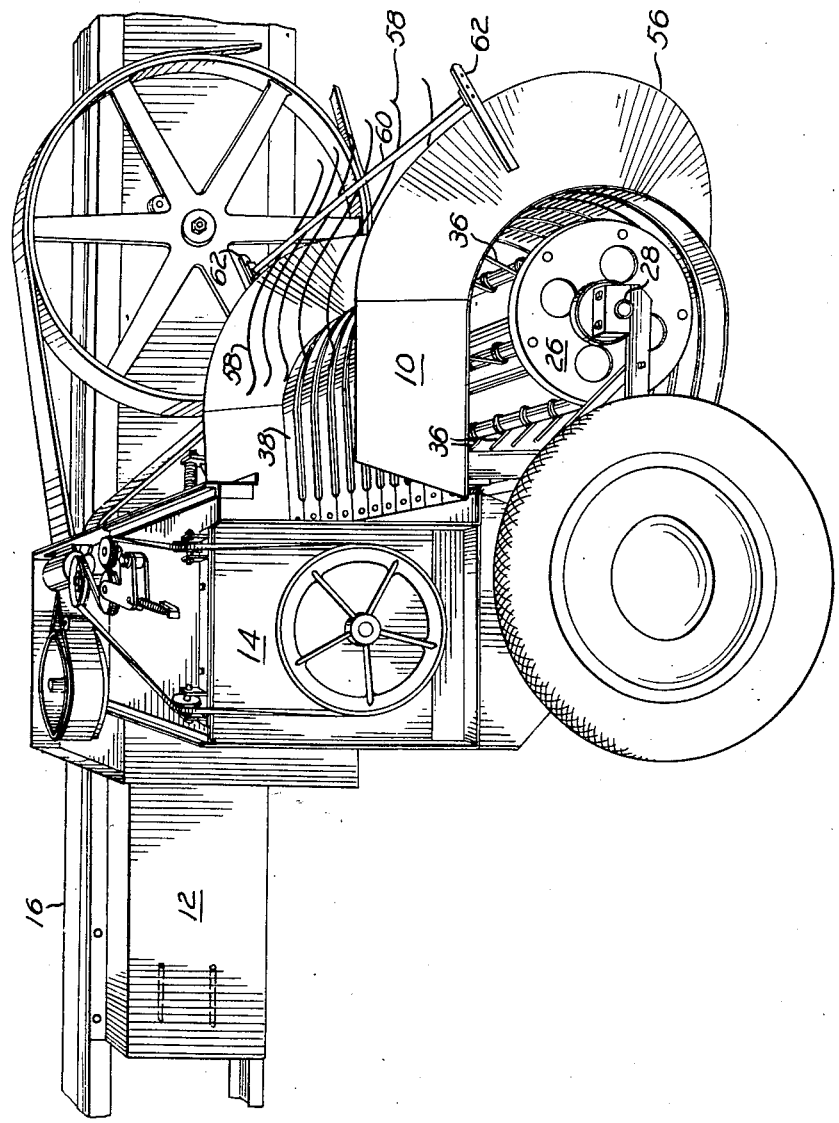
Fig. 1 is a perspective view of a pick-up unit embodying the present invention.

With reference particularly to Figs. 1 and 2, there is illustrated a windrow pick-up unit 10, which is shown in connection with a baler 12. The pick-up unit is adapted to pick-up the windrowed hay or other crop material and feed it to a feeding unit 14 which conveys it to a baling chamber 16 on the baler. The pick-up unit 10 is hingedly mounted at the forward end of the feeding unit 14 and is adjustable in a vertical direction. The feeding unit 14 is in turn supported upon an outrigger-like frame 18 (Fig. 2) which extends transversely of the line of draft of the implement.

The pick-up 10 includes a rotatable inner cylinder 26 supported on a shaft 28 and including a plurality of pick-up tines 36, which are arranged in rows and which are adapted to project between the spaced apart stripper plates 38 supported on the frame of the pick-up unit.

The forward end of the pick-up unit includes a wind guard 54 for holding the crop material in contact with the stripper plates 38, and a pair of flared end members 56 for directing the crop into the pick-up unit. The wind guard 54 comprises a plurality of hold-down strips 58 which are suitably attached, as by the welding indicated at 59 in Figs. 3 and 4, to a transversely extending tube or rod 60. The rod 60 is journalled at opposite ends thereof in a forwardly extending strap member 62 suitably attached, as by the welding indicated at 63 in Fig. 2, to each of the flared end members 56.

Each of the forwardly extending members 62 (Figs. 3 and 4) is provided with a plurality of spaced apart openings 64, which are selectively alignable with the center of the tubular rod 60 to permit entry of a pin or the like (not shown) therethrough, so that the position of the hold-down strips relative to the stripper plates 38 can be adjusted for varying crop conditions. The hold-down strips 58 are suitably curved and are rigidly attached to the transversely extending rod 60 in a spaced-apart relationship across the pick-up.

A positioning bracket or element 66 is attached to one end of the transversely extending rod 60 so as to determine a lowered and a raised position for the hold-down strips. The bracket 66 includes a rectangular plate portion 68 which is suitably attached as by the welding indicated at 69 in Figs. 3 and 4, to the rod 60 in a position parallel to the forwardly extending member 62 and a bent over, flat surfaced tab or ear portion 70. The upwardly facing flat surface 71 (Fig. 4) of the tab 70 engages the lower edge portion 73 of the forwardly extending member 62 so as to determine the lowered position of the hold-down strips (Fig. 3). In this position, the hold-down strips 58 are maintained a few inches above the stripper plates 38 (Figs. 2 and 3). The rearward edge 75 of the tab 70 is cut away so that it permits the hold-down strips 58 to be moved to the vertical position (Fig. 4) before it engages the lower edge 73 of the forwardly extending member 62 and thereby prevents further movement. Thus it is seen that the forwardly extending member 62 also serves as a stop for the element 66 in either limit position of the hold-down strips 58. In the raised position, the hold-down strips serve to protect the operator from becoming entangled with the rotating tines, if it becomes necessary to clear the material from the machine during operation.

It has been determined that hold-down strips as described above, which are not resiliently biased toward the stripper plates, as in the prior structures, substantially eliminate stoppages of the equipment due to clogging, and result in more even feeding under extremely light loads. The construction of the hold-down strips 58 is such that they serve the dual purpose of holding material against the stripper plates and, at the same time, of protecting the operator from coming in contact with the rotatable tines. In addition, when the machine is used as a stationary baler, the hold-down strips may be raised to form a baffle which causes all of the material pitched into the machine to be fed into the baler.

It should also be noted that the disposition of the hold-down strips 58 relative to the rod 60 renders the hold-down strips self-sustaining in either of the selected positions of Figs. 3 and 4. The curved strips 58 are mounted on the rod 60 in an off-center position with respect to the length of the strips, so that the upper end 77 of each of the strips is longer than the lower end 79. In this way the center of gravity of the strips 58 is disposed in spaced relation to the rod 60 and urges the wind guard to rotate about the axis of the rod. Consequently, when the strips are in the position shown in full in Fig. 2, the weight of the strips acts downwardly to the rear of the rod 60 to press the tab 70 against the lower edge 73 of the member 62 and thereby maintain the wind guard in the position shown. Also, when the wind guard 54 is moved to the position seen in Fig. 4 (indicated in broken lines in Fig. 2), the center of gravity of the curved strips 58 is disposed forwardly of the rod 60 and acts to press the rearward edge 75 of the tab 70 against the member 62 and thereby maintain the wind guard in its forward position.

Although shown and described with respect to particular apparatus, it will be readily apparent that various modifications may be made without departing from the principles of the present invention.

I claim:

1. In combination with a windrow pick-up unit having a pair of laterally spaced side members extending forwardly along opposite sides of the pick-up to define a guide for rearward movement of the crop material picked up by the unit, a wind guard comprising a support member mounted on each of said side members in forwardly extending relation thereto, a rod journalled at opposite ends thereof on said support members, a plurality of spaced-apart hold-down strips supported on said rod in laterally extending relation thereto, said strips being mounted on said rod with their center of gravity spaced from the axis of said rod to thereby urge the rotation of said rod, and means carried at one end of said rod in eccentric relation thereto and for rotation therewith for engagement with the adjacent one of said support members at a pair of positions thereon to thereby limit the rotation of said rod to a predetermined arc, said means being disposed relative to said hold-down strips and said one support member so that when said means engages the support member at either of said pair of positions thereon, the weight of said hold-down strips is effective to urge said means against said support member and thereby maintain said hold-down strips in the selected position.

2. In combination with a windrow pick-up unit, having a pair of laterally spaced side members extending forwardly along opposite sides of the pick-up to define a guide for rearward movement of the crop material picked up by the unit, a wind guard comprising a support member mounted on each of said side members in forwardly extending relation thereto, a rod journalled at opposite ends thereof on said support members, a plurality of spaced-apart hold-down strips supported on said rod in laterally extending relation thereto, and a wind guard positioning means carried at one end of said rod in eccentric relation thereto for rotation therewith for engagement with the adjacent one of said support members at a pair of positions thereon to thereby limit the rotation of said rod to a predetermined arc, said wind guard being arranged with its center of gravity spaced from the axis of said rod to thereby bias said positioning means against said one support member when said positioning means is disposed in engagement with said support member at either of said pair of positions, and said rod being adjustable relative to said support member to afford a selected spacing of said hold-down strips relative to said pick-up unit.

3. In combination with a windrow pickup unit having a pair of laterally spaced side members extending forwardly along opposite sides of the pick-up to define a guide rearward movement of the crop material picked up by the unit, a wind guard comprising a support member mounted on each of said side members in forwardly extending relation thereto, said support members including a plurality of aligned pairs of journal portions, an elongated rod disposed between said support members and rotatably supported thereby through means of a selected aligned pair of said journal portions, a plurality of spaced-apart hold-down strips fixed on said rod in transverse relation thereto, and means for limiting the rotation of said rod comprising a positioning element fixed at one end of said rod in eccentric relation thereto for rotation therewith, said element being engageable with the adjacent one of said support members at a pair of spaced apart positions thereon to thereby limit the rotation of said rod to a predetermined arc, and said element being disposed relative to said hold-down strips and said one support member so that when said means engages either of said pair of positions on said one support member the weight of said hold-down strips is effective to urge said element against said one support member and thereby maintain said hold-down strips in the selected position.

4. Apparatus as set forth in claim 3, wherein said one support member comprises a strap member having an edge portion which is spaced from the axis of said rod at any selected position of the latter a distance less than the radius of movement of said positioning element, whereby said element is engageable with a pair of longitudinally spaced positions on said strap member to thereby define an arc of rotation of said rod of predetermined magnitude in any selected position of said rod with respect to said journal portions.

5. In combination with a windrow pick-up unit having a pair of laterally spaced side members extending forwardly along opposite sides of the pick-up to define a guide for rearward movement of the crop material picked up by the unit, a wind guard comprising a support member mounted on each of said side members in forwardly extending relation thereto, a rod journaled at opposite ends thereof for rotation on said support members, a plurality of spaced-apart hold-down strips supported on said rod in laterally extending relation thereto, said strips being mounted on said rod with their center of gravity spaced from the axis of said rod to thereby urge the rotation of said rod, and means for limiting the rotation of said rod at both ends of an arc of rotation comprising arm means fixed to said rod and extending radially therefrom adjacent one of said support members and ear portions attached to and extending transverse to said arm means for engagement with said last mentioned support means and thereby determining the limit of rotation of said rod at each end of its arc of rotation.

References Cited in the file of this patent

UNITED STATES PATENTS

| | | |
|---|---|---|
| 1,788,490 | Lewis | Jan. 13, 1931 |
| 2,391,763 | Anderson | Dec. 25, 1945 |
| 2,430,734 | Raney et al. | Nov. 11, 1947 |
| 2,458,713 | Linderer | Jan. 11, 1949 |